United States Patent [19]

Clifford et al.

[11] 4,249,558

[45] Feb. 10, 1981

[54] BYPASS VALVE

[75] Inventors: Jimmie D. Clifford; David E. Girsch, both of Waterloo; Michael K. Magruder, Hudson, all of Iowa

[73] Assignee: Deere & Company, Moline, Ill.

[21] Appl. No.: 959,239

[22] Filed: Nov. 9, 1978

[51] Int. Cl.[3] .......... G05D 7/01

[52] U.S. Cl. .......... 137/115; 137/517; 417/299

[58] Field of Search .......... 137/115, 498, 517; 417/299

[56] References Cited

U.S. PATENT DOCUMENTS

| | | | |
|---|---|---|---|
| 3,115,156 | 12/1963 | Mortimer | 137/517 X |
| 3,234,961 | 2/1966 | Arnes | 137/517 |
| 3,522,999 | 8/1970 | Liles | 417/299 X |
| 3,889,709 | 6/1975 | Dwyer | 417/299 X |

*Primary Examiner*—Robert G. Nilson

[57] ABSTRACT

A bypass valve includes a valve body containing a spring loaded valve member. The valve body includes first and second interconnected bores respectively connected to the outlet and inlet of a fluid pump feeding a fluid function. A valve member slidably disposed in the valve bores includes a cylindrical portion and a frusto-conical portion cooperating with the first and second bores to provide a predetermined pressure drop across both portions at a first flow rate with cold fluid and at a second flow rate with hot fluid. The spring is set so as to allow fluid to bypass from the pump outlet to the inlet until the predetermined pressure drop is exceeded.

6 Claims, 1 Drawing Figure

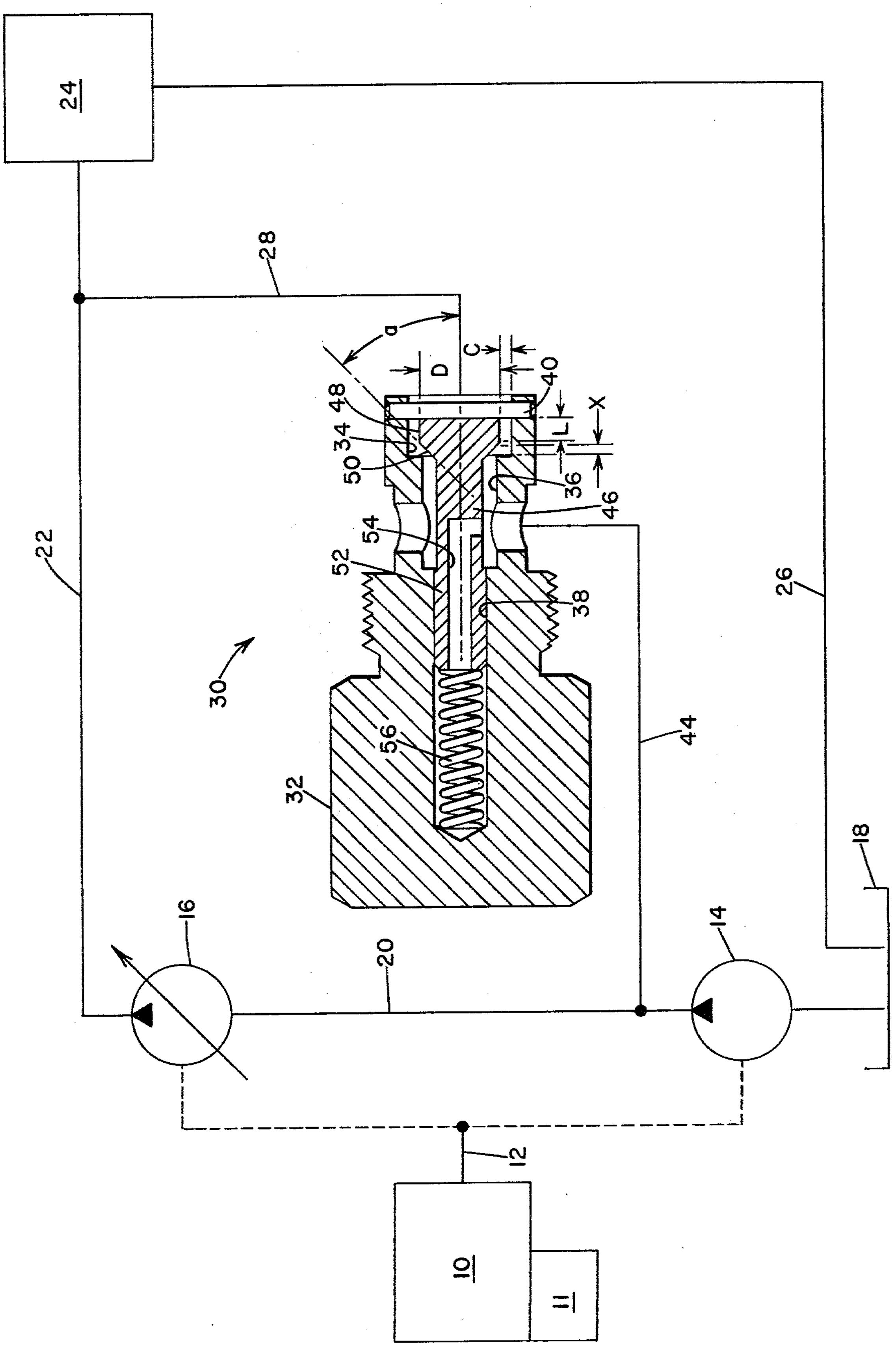
24
28
a
C
D
40
48
34
50
36
46
X
L
54
52
38
22
26
30
56
44
32
18
16
14
20
12
10
11

BYPASS VALVE

BACKGROUND OF THE INVENTION

The present invention relates generally to hydraulic systems driven by internal combustion engines and more particularly to a bypass valve which bypasses hydraulic fluid from the outlet to the inlet of a hydraulic pump at engine cranking speed and then blocks the bypass at low engine idle speed.

In the past, internal combustion engines which drove hydraulic systems required large electrical starting motors capable of turning over the engines while driving the pumps and pump-associated fluid functions. While numerous ways of disengaging the hydraulic system have been tried, they have always had the disadvantage of being complex or expensive or both.

None of the systems heretofore devised has been able to cause the pump to operate at all temperatures at no load by bypassing fluid from the pump outlet to its inlet when the flow rate is around the rate developed at engine cranking speed and blocking the bypass when the flow rate is at the rate developed at low engine idle speed. One of the major problems has been in dealing with the temperature induced viscosity changes in the system's hydraulic fluid which make a device developed for low temperatures unsuitable for high temperatures and vice versa.

SUMMARY OF THE INVENTION

The present invention provides a bypass valve located between the pump outlet and inlet which is activated by pump flow when the flow rate excedes a predetermined value that is greater than the flow developed at engine cranking speed, but less than the flow at low engine idle speed. The valve includes two sensing surfaces which are respectively responsive to cold and hot fluid flow to allow the bypass to operate up to first and second predetermined flow rates which are less than those at low engine idle speed.

The above and additional advantages of the present invention will become apparent to those skilled in the art from a reading of the following detailed description when taken in conjunction with the accompanying drawing.

BRIEF DESCRIPTION OF THE DRAWING

The drawing shows a schematic, partially in section, of a hydraulic circuit embodying the present invention.

DESCRIPTION OF THE PREFERRED EMBODIMENT

Referring now to the drawing, therein is shown an internal combustion engine 10 started by a starting motor 11. The engine 10 has a drive shaft 12 connected to drive a fluid system which incorporates a charge pump 14 and a main pump 16, both of which are driven by the drive shaft 12.

The charge pump 14 draws fluid from a fluid reservoir 18 and provides it to a pump inlet 20. The main pump 16 draws fluid from the pump inlet 20 to provide pressurized fluid out through a pump outlet 22.

Pressurized fluid from the pump outlet 22 drives conventional fluid functions 24 which may be hydraulic cylinders and motors with their associated valving. Fluid exits from the fluid functions 24 via a return 26 to the reservoir 18.

An outlet passage 28 connects a bypass valve 30 to the pump outlet 22. The bypass valve 30 includes a valve body 32 having interconnected and coaxial first, second, and third bores 34, 36, and 38, respectively. A stop pin 40 is disposed in the valve body 32 across the first bore 34 proximate its connection to the outlet passage 28. The second bore 36 opposite its connection to the first bore 34 is connected to an inlet passage 44 which is connected to the pump inlet 20.

A valve member 46 is disposed in the bores and includes a cylindrical portion 48, a frusto-conical portion 50, and a stem portion 52.

The cylindrical portion 48 has a diameter designated by "D" in the drawing and a longitudinal length designated by "L". The cylindrical portion 48 is disposed in the first bore 34 and has a radial clearance designated by "C" which is equal to one-half the difference in diameters between the first bore 34 and the cylindrical portion 48. The cylindrical portion 48 is designed such that the pressure drop across its longitudinal length is defined by the equation:

$$\Delta P = 12\, Q \mu L / \pi D\, C^3$$

Where:

- $Q$=flow in in $^3$/sec
- $\mu$=dynamic viscosity in $1b_f$-sec/in$^2$
- D=diameter of said cylindrical portion in in.
- C=half of the diameter of said first bore minus half the diameter of said cylindrical portion in in.
- L=longitudinal length of said cylindrical portion in in.
- $\Delta$P=change in pressure in $1b_f$/in$^2$ The frusto-conical portion 50 which is adjacent to the cylindrical portion 48 cooperates with the second bore 36 to have a discharge angle designated by the letter "a" in the drawing which is equal to one-half the vertex angle of the cone in which the frusto-conical portion 50 could be exactly positioned. The valve member 46 is longitudinally movable from an open position in which it abuts the stop pin 40 to a closed position in which the frusto-conical portion 50 abuts the second bore 36 so as to block communication between the first bore 34 and the second bore 36. This longitudinal distance between the open and closed positions is designated by the letter "X" in the drawing. The frusto-conical portion 50 cooperates with the second bore 36 so as to have a longitudinal pressure drop thereacross which is according to the equation:

$$\Delta P = \frac{\rho}{2}\left(\frac{Q}{KXd \sin a}\right)^2$$

Where:

- $\rho$=fluid density in $1b_f$-sec $^2$/in$^4$
- K=discharge coefficient
- X=longitudinal distance between said opened and closed positions in inches
- d=diameter of said second bore in in.
- a=half of the vertex angle of said frusto-conical portion in degrees.

The stem portion 52 is slidable in the third bore 38 and includes a relief passage 54 which connects the third bore 38 with the second bore 36 to maintain equal pressure therebetween. Between a closed end of the third bore 38 and the valve member 46 is a spring 56 having a predetermined spring rate and length which urges the valve member 46 against the stop pin 40 until the combined pressure drop across the cylindrical portion 48 and the frusto-conical portion 50 exceeds a predetermined pressure drop at which time the valve member 46 will be moved to its closed position.

In operation, when the starting motor 11 cranks the engine 10 for starting, the charge pump 14 and the main pump 16 are driven to provide pressurized fluid to the pump outlet 22 at a flow which is dependent in part upon the temperature of the fluid.

Initially, fluid will pass from the pump outlet 22 to the outlet passage 28 and thence through the first and second bores 34 and 36 past the valve member 46. From the second bore 36 fluid is passed into the inlet passage 44 and directly into the pump inlet 20 so as to provide a minimum restriction to flow and impose a minimum load on the main pump 16 while the engine 10 is cranking.

Since the total pressure drop across the valve member 46 is equal to the sum of the pressure drops across the cylindrical portion 48 and the frusto conical portion 50, the total pressure drop across the valve member 46 will be governed by the equation, $$\Delta P = \frac{12\,Q\,\mu\,L}{\pi C^3} + \frac{\rho}{2}\left(\frac{Q}{KXD\sin a}\right)^2$$

as defined above.

As would be evident to those skilled in the art from a study of the above equation, flow past the cylindrical portion 48 is a function of dynamic viscosity while flow past the frusto-conical portion 50 is a function of fluid density. Since dynamic viscosity changes greatly with temperature while fluid density does not, the discharge angle "a" in the distance of valve travel "X" of the frusto-conical portion 50 can be chosen so as to provide the necessary pressure drop to close the valve member 46 at a first given flow for hot fluid when the dynamic viscosity is sufficiently low to minimize the effect of the flow past the cylindrical portion 48. Similarly, the clearance "C" of the cylindrical portion 48 can be sized to provide the necessary pressure drop at a second given flow for cold fluid when the dynamic viscosity is high.

When the engine 10 catches and starts, it will come up to low engine idle speed and cause the main pump 16 to increase the flow rate at the pump outlet 22. At the first given flow for hot fluid or the second given flow for cold fluid, the pressure drop across the valve member 46 will reach the point where it overcomes the force of the spring 56 causing the valve member 46 to move to a closed position. With the bypass valve 30 closed, fluid in the pump outlet 22 is supplied to the fluid functions 24 for normal running operation.

When the engine 10 is stopped, the main pump 16 stops pumping and allows the bypass valve 30 to open to its original position.

While the invention has been described in conjunction with this specific embodiment, it it to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. In a fluid system having a fluid pump with an inlet connected to a fluid reservoir and an outlet connected to a fluid function, a valve comprising:

(a) a valve body having interconnected first and second longitudinally extending coaxial bores provided therein, said first bore connected opposite said second bore to said pump outlet and said second bore connected opposite said first bore to said pump inlet;

(b) longitudinally extending valve means disposed in said first and second bores and movable between open and closed positions respectively allowing and blocking fluid communication between said first and second bores, said valve means comprising a cylindrical portion, a frusto-conical portion and a stem portion, said valve means cooperating with said first and second bores for causing a predetermined pressure drop thereacross at a first predetermined flow of fluid above a predetermined dynamic viscosity or at a second predetermined flow of fluid below said predetermined dynamic viscosity; and (c) biasing means disposed in said valve body for urging said valve means to the open position and responsive to said predetermined pressure drop to allow said valve means to move to the closed position.

2. The valve as claimed in claim 1 wherein said valve body has a third bore provided therein coaxial with and connected to said second bore, said biasing means is disposed in said third bore, and said valve stem is slidably disposed in said third bore abutting said biasing means and having passage means provided therein connecting said third bore to said second bore.

3. In a fluid system having a main fluid pump with an inlet connected to a fluid reservoir and an outlet connected to a fluid function, a bypass valve comprising:

(a) a valve body having first and second longitudinally extending bores provided therein, said first bore having a first end connected to said pump outlet and a second end connected to said second bore, said second bore having a first end connected to said first bore and a second end connected to said pump inlet;

(b) valve means disposed in said first and second bores and movable between open and closed positions respectively allowing and blocking fluid communication between said first and second bores, said valve means comprising a first longitudinally extending surface disposed in said first bore and cooperative therewith to have a first longitudinal fluid pressure drop thereacross which is a function of fluid flow and fluid dynamic viscosity, a second longitudinally extending surface disposed in said first and second bores and cooperative therewith to have a longitudinal fluid pressure drop thereacross which is a function of fluid flow and fluid density, and a longitudinally extending stem member disposed in said second bore; and (c) biasing means disposed in said valve body adjacent to said stem member for urging said valve means to the open position bypassing said fluid function and for allowing said valve means to move to the closed position to cause said fluid to flow to said fluid function when the sum of the first and second longitudinal fluid pressure drops across said first and second longitudinally extending surfaces exceeds a predetermined total longitudinal fluid pressure drop.

4. The bypass valve as claimed in claim 3 wherein said valve body has a third bore provided therein coaxial with and connected to said second bore, said biasing means is disposed in said third bore and is moved by said longitudinally extending item member which is slidably disposed in and guided by said third bore abutting said biasing means and having passage means provided therein connecting said third bore to said second bore.

5. In a fluid system having a main fluid pump with an inlet connected to a fluid reservoir and an outlet connected to a fluid function, a bypass valve comprising:

(a) a valve body having coaxial interconnected first and second longitudinally extending bores provided therein, said first bore connected opposite said second bore to said pump outlet and said second bore connected opposite said first bore to said pump inlet;

(b) valve means disposed in said first and second bores, said valve means comprising a first longitudinally extending cylindrical portion disposed in said first bore concentric therewith, a longitudinally extending frusto-conical portion disposed in said first and second bores concentric therewith, and a longitudinally extending stem member disposed in said second bore, said valve means being movable between opened and closed positions wherein said longitudinally extending frusto-conical portion respectively is distal from and abuts said second bore, said valve means cooperative with said first and second bores to provide a pressure drop across said cylindrical and frusto-conical portions according to the equation:

$$\Delta P = \frac{12\,Q\,\mu\,L}{\pi\,D\,C^3} + \frac{\rho}{2}\left(\frac{Q}{KXd\sin a}\right)^2$$

where

Q=flow in in. $^3$/sec $\mu$=dynamic viscosity in $1b_f$-sec/in$^2$

D=diameter of said cylindrical portion in in.

C=half of the diameter of said first bore minus half diameter of cylindrical portion in in.

L=longitudinal length of said cylindrical portion in in.

$\Delta$P=change in pressure in $1b_f$/in$^2$ $\rho$=fluid density in $1b_f$-sec 2/in$^4$ K=discharge coefficient X=longitudinal distance between said opened and closed positions d=diameter of said second bore in in.

a=half of the vertex angle of said frusto-conical portion in degrees; and (c) a spring disposed in said valve body adjacent to said stem member for urging said valve means to the opened position thereby allowing fluid to bypass from said pump outlet to said pump inlet, and for allowing said valve means to move to the closed position directing said fluid to said fluid function means when the total pressure drop across both said longitudinally extending cylindrical and frusto-conical portions exceeds a predetermined total pressure drop.

6. The bypass valve as claimed in claim 5 wherein said valve body has a third bore provided therein coaxial with and connected to said second bore, said spring is disposed in said third bore and is moved by said longitudinally extending stem member which is partially slidably disposed in and guided by said third bore abutting said spring and having passage means provided therein connecting said third bore to said second bore.

* * * * *

UNITED STATES PATENT AND TRADEMARK OFFICE
CERTIFICATE OF CORRECTION

PATENT NO. : 4,249,558
DATED : 10 February 1981
INVENTOR(S) : Jimmie D. Clifford; David E. Girsch, and Michael K. Magruder It is certified that error appears in the above—identified patent and that said Letters Patent is hereby corrected as shown below:

Column 6, line 15, delete "sec 2/in$^4$" and insert -- sec$^2$/in$^4$ --.

Signed and Sealed this

***Second* Day of *February 1982***

[SEAL]

*Attest:*

GERALD J. MOSSINGHOFF

*Attesting Officer* — *Commissioner of Patents and Trademarks*

UNITED STATES PATENT AND TRADEMARK OFFICE

CERTIFICATE OF CORRECTION

PATENT NO. : 4,249,558

DATED : 10 February 1981

INVENTOR(S) : Jimmie D. Clifford; David E. Girsch, and Michael K. Magruder

It is certified that error appears in the above—identified patent and that said Letters Patent is hereby corrected as shown below:

Column 3, change the equation to read:

$$\Delta P = \frac{12\ Q\ \mu\ L}{\pi D C^3} + \frac{\rho}{2}\left(\frac{Q}{KXd\ \sin\ a}\right)^2$$

Signed and Sealed this

*Twenty-seventh* Day of *April 1982*

|SEAL|

*Attest:*

GERALD J. MOSSINGHOFF

*Attesting Officer* *Commissioner of Patents and Trademarks*